United States Patent [19]

Yoshino et al.

[11] Patent Number: 5,220,257
[45] Date of Patent: Jun. 15, 1993

[54] MOTOR TORQUE CONTROL CIRCUIT WITH BARKING CONTROL AND MOTOR DRIVE SYSTEM USING THE SAME

[75] Inventors: Motoyasu Yoshino; Norio Fujii, both of Kyoto, Japan

[73] Assignee: Rohm Co., Ltd., Kyoto, Japan

[21] Appl. No.: 913,371

[22] Filed: Jul. 15, 1992

[30] Foreign Application Priority Data

Jul. 15, 1991 [JP] Japan .................. 3-199996

[51] Int. Cl.$^5$ ............................................ H02P 3/00
[52] U.S. Cl. .................................. 318/254; 318/138; 318/54; 318/432; 388/932
[58] Field of Search .................. 318/254, 365, 138, 439, 318/798–812, 432, 741, 256, 258, 611, 696, 280–286, 54, 56, 65, 63, 370, 433; 388/803, 809, 916, 930, 932

[56] References Cited

U.S. PATENT DOCUMENTS

| | | | |
|---|---|---|---|
| 4,042,862 | 8/1977 | Franklin | 318/800 |
| 4,105,935 | 8/1978 | Arai et al. | 388/805 X |
| 4,229,684 | 10/1980 | Saglini et al. | 318/611 X |
| 4,368,411 | 1/1983 | Kidd | 318/254 |
| 4,520,300 | 5/1985 | Fradella | 318/138 X |
| 4,670,696 | 6/1987 | Byrne et al. | 318/138 X |
| 5,012,171 | 4/1991 | Sember | 318/696 |
| 5,070,285 | 12/1991 | Yamane et al. | 318/811 X |

*Primary Examiner*—Jonathan Wysocki
*Attorney, Agent, or Firm*—Fay, Sharpe, Beall, Fagan, Minnich & McKee

[57] ABSTRACT

A motor control circuit, in which the motor is driven to rotate by a driving current according to a torque control signal and the motor rotation is stopped by generating a torque on the motor in the reversing direction when a stop signal for stopping the motor is received, further being provided with a level inverting circuit disposed between a torque control signal generating circuit and a drive circuit for inverting the level of the torque control signal with respect to a predetermined reference level, a level inverted torque control signal by the level inverting circuit is outputted to the drive circuit when the stop signal is received, and further provided with a reference signal generating circuit generating a reference signal corresponding to a reference rotational speed of the motor as well as generating another reference signal corresponding to a rotational speed lower than that of the reference rotational speed when the stop signal is received.

10 Claims, 3 Drawing Sheets

OUTPUT OF HALL ELEMENT 1

DETECTION PULSE P

REFERENCE PULSE K

TORQUE CONTROL SIGNAL T

DRIVE VOLTAG WAVEFROM OF DRIVE CIRCUT 15

MOTOR TORQUE CONTROL CIRCUIT WITH BARKING CONTROL AND MOTOR DRIVE SYSTEM USING THE SAME

BACKGROUND OF THE INVENTION

1. Field of the Invention

The present invention relates to a motor control circuit, and more specifically relates to a motor control circuit for apparatuses incorporating a motor rotating at a constant speed such as a hard disk drive, an optical disk drive, many other drive devices incorporating a motor and many office automation apparatuses incorporating a fan motor, which detects rotation speed of a motor to control the same and is able to stop the rotation of the motor rapidly when required, and further relates to a motor drive system using the same.

2. Description of Related Art

FIG. 3 is a conventional control circuit for a three phase motor which has been used for many kinds of office automation apparatuses.

The motor control circuit comprises a motor 9 including three windings 8a, 8b and 8c, a sensing circuit including Hall elements 1 as its major components, an input amplifier circuit 2 including differential amplifiers 2a as its major components, a reference signal generating circuit 3 which generates a signal determining a reference rotation speed of the motor 9, a torque control signal generating circuit 4 and a drive circuit 5. The torque control signal generating circuit 4 includes a speed comparing circuit 4a and an error amplifier circuit 4b. The drive circuit 5 includes a rotational direction changing-over circuit 5a which outputs a drive current for the motor 9 and stops the rotation of the motor 9 at an early stage by changing-over the rotational direction of the motor 9 by changing-over the drive current direction, and a drive current ceasing rotational number detection circuit 5b which detects the rotational number of the motor 9 for ceasing the drive current therefor and generates a signal for ceasing the drive current.

The operation of the motor control circuit is explained principally with reference to the signaling system in one phase of the three phases. First, the output signal from the Hall element 1, which detects the rotating condition of the motor 9, is applied to the input amplifier circuit 2 and is amplified at the differential amplifier 2a. Thereafter the amplified output is waveshaped via a logic circuit, for example, and is outputted as a detection pulse P, and the detection pulse P is transmitted to the torque control signal generating circuit 4 and the drive circuit 5.

The reference signal generating circuit 3 produces a reference pulse K having a predetermined width and a phase which determines the rotation speed of the motor 9 and outputs the same. The speed comparing circuit 4a compares the detection pulse P with the reference pulse K, and further the amount of deviation of the periods or the phases based on the comparison result is integrated and the integrated value (normally in a form of voltage) is applied as an error to the error amplifier circuit 4a. The error amplifier circuit 4a is an amplifier which is constituted by a differential amplifier, for example, and uses the level of the torque control signal corresponding to the reference rotational number as a reference level, amplifies the error component with respect to the reference level for the torque control and adds the amplified error component to the reference level to generate a necessary torque control signal at the moment. Thereby, a torque control signal (normally in a form of voltage) T corresponding to the phase deviation amount between these pulses P and K is produced. The produced signal T is transmitted to a torque control terminal 5c in the drive circuit 5.

The drive circuit 5 receives the detection pulse P and produces a drive signal based on the received detection pulse P. At this instance, the drive circuit 5 further receives the torque control signal T, and produces and outputs a drive current which determines the amplitude of the drive signal (amount of current), namely the magnitude of torque, according to the magnitude (the voltage level) of the received signal T. Thereby, with the drive current the motor 9 is rotated in the direction to eliminate the error in the error amplifier circuit 4a. Thus, the rotation number of the motor 9 is controlled to settle at the reference rotational speed.

The above operation is explained further specifically. When the rotation speed of the motor 9 drops in comparison with the period of the reference pulse K which sets at the reference rotational speed, and the period of the detection pulse P lags, the drive circuit 5 outputs according to the torque control signal T to the motor 9 an output current which induces a larger torque than a reference torque value corresponding to a torque which balances with a load under the reference rotational speed. Contrarily, when the period of the detection pulse P advances, the drive circuit 5 applies according to the torque control signal T to the motor 9 a drive current which reduces the torque below the reference torque value or ceases the drive current. When the motor 9 is rotating at the set rotational number, under the condition of the reference rotational speed, the torque control signal T is maintained at a fixed level predetermined as a reference value.

Under a normal control, the torque control signal T is determined with reference to the detection pulse P of one phase as explained above, the drive currents for the three phase windings 8a, 8b and 8c are determined based on the detection pulse P and the determined currents are supplied to the motor 9 so as to control the rotational speed of the motor 9 to be constant.

When the drive circuit 5 receives a stop signal from an external device, the drive circuit 5 outputs a drive current which induces the maximum torque in the opposite direction and supplies the same to the windings 8a, 8b and 8c to thereby induce a braking force on the motor 9 in order that the rotational direction changing-over circuit 5a stops the rotation of the motor 9 as soon as possible. Due to the torque of the opposite direction the rotational speed of the motor 9 is decelerated to reduce the rotational speed. When the rotational speed reduces down to a predetermined speed, in other words reduces down to a predetermined rotational number, the drive current ceasing rotational number detection circuit 5b detects the speed reduction and the drive circuit 5 ceases the supply of the drive current to the windings 8a, 8b and 8c. Thereafter the rotation of the motor 9 is stopped through the frictional force. With the conventional motor control circuit the rotation of the motor 9 is stopped as thus explained.

When the timing of ceasing the drive current outputting of the opposite direction is further delayed from the timing when the rotational speed of the motor 9 reduces down to the predetermined speed, in other words, when the detection rotational number of the drive current ceasing rotational number detection circuit 5b is set at a further lower rotational number, the motor can be stopped in a further shorter time. However, if the detection rotational number is set at such a lower rotational number, there is a possibility that the motor rotates in the reversing direction with the conventional motor stopping method because the motor braking control is performed by adding the maximum torque of the opposite direction. Because of such possibility, the predetermined motor speed could not be lowered sufficiently such that it took a long time to stop the motor depending upon the frictional force. As a result, the time required for stopping the motor could not be shortened sufficiently.

SUMMARY OF THE INVENTION

The motor control circuit according to the present invention, in which the motor is rotated by a drive current according to a torque control signal and when a stop signal for stopping the rotation of the motor is received a torque of the opposite direction, is induced in the motor to stop the rotation thereof, is characterized, in that a level inverting circuit which inverts the level of the torque control signal with respect to a predetermined reference level is provided between the torque control signal generating circuit and the drive circuit, a torque control signal whose level is inverted by the level inverting circuit upon reception of the stop signal, is outputted to the drive circuit, and upon reception of the stop signal the reference signal generating circuit generates another reference signal corresponding to a rotating speed lower than the reference rotating speed other than a reference signal corresponding to a reference rotational speed of the motor.

The motor control circuit thus constituted enables to stop the motor rotation rapidly with no possibility of motor reversing rotation during the motor stopping control.

Insofar as the operation of the motor control circuit which maintains the motor rotation in the normal direction is substantially the same as the conventional one as explained above, the further explanation thereon is omitted. Characteristic functions of the motor control circuit according to the present invention are explained with reference to the operation during the motor rotation stopping control. Assuming that the drive circuit receives a stop signal for stopping the motor rotation from an external device under the condition that the motor is rotating in the normal positive direction with the motor control circuit having the above constitution, with the conventional drive circuit a large reversing torque was generated at the initial stage and the circuit waited until the motor, rotating number reduces below a predetermined value, under which such control the torque control signal performed no function. On the other hand, with the present invention the torque control signal of which level is inverted by the output level inverting circuit is made use of during the motor stopping control and the motor stopping control is performed according to the inverted torque control signal, thereby the magnitude of reversing torque decreases as the rotating number of the motor decreases so that generation of a large reversing torque near motor standstill is avoided to thereby prevent the motor reversing rotation.

When the motor drive current is interrupted at the moment when the motor rotational number reduces to such a degree that enables stopping of the motor rotation, thereafter the motor is immediately stopped due to the frictional force against the rotation of the motor. In comparison with the operation in the conventional circuit in which the substantial time required for stopping the motor rotation is occupied by the braking operation via the frictional force, with the present invention the time required for the braking operation via the frictional force is reduced and the motor rotation can be stopped as a whole in a short time.

Further, the reference pulse generating circuit of the present invention incorporates a dividing circuit, in that the reference pulse generating circuit is composed of a pulse generating circuit which generates a pulse having a higher frequency than that of the reference pulse and the dividing circuit which generates the reference pulse by dividing the pulse from the pulse generating circuit. The reference pulse generating circuit is further adapted to receive the stop signal, and upon reception of the stop signal to change, for example, the dividing rate of the reference pulse and to generate a reference pulse corresponding to a lower rotational speed or a rotational number near a standstill rotational speed.

Via the comparison of the reference pulse corresponding to the lower rotational number with the detection pulse P a torque control signal corresponding to the large error signal is generated, thereby a large reversing torque is generated at the moment when a stop signal is received. Moreover, although the addition of the reference pulse generating circuit and the level inverting circuit to the conventional motor control circuit is a minor modification in view of the circuit configuration, a highly effective motor stopping control is achieved with the present invention.

Accordingly, an object of the present invention is to provide a motor control circuit performing the motor rotation stopping control by driving the motor into the reversing direction which hardly causes the motor to reverse rotation.

Further, another object of the present invention is to provide a motor control circuit performing the motor rotation stopping control by driving the motor into the reversing direction which enables to stop the motor rotation at an early stage.

Still further, still another object of the present invention is to provide a motor control circuit performing the motor rotation stopping control by driving the motor into the reversing direction which enables to stop the motor rotation at an early stage with a slight modification of the conventional motor control circuit.

Moreover, still another object of the present invention is to provide a motor driving system performing the motor rotation stopping control by driving the motor into the reversing direction which enables to stop the motor rotation at an early stage without causing a reverse rotation of the motor.

DESCRIPTION OF THE PREFERRED EMBODIMENT

Figure 1:
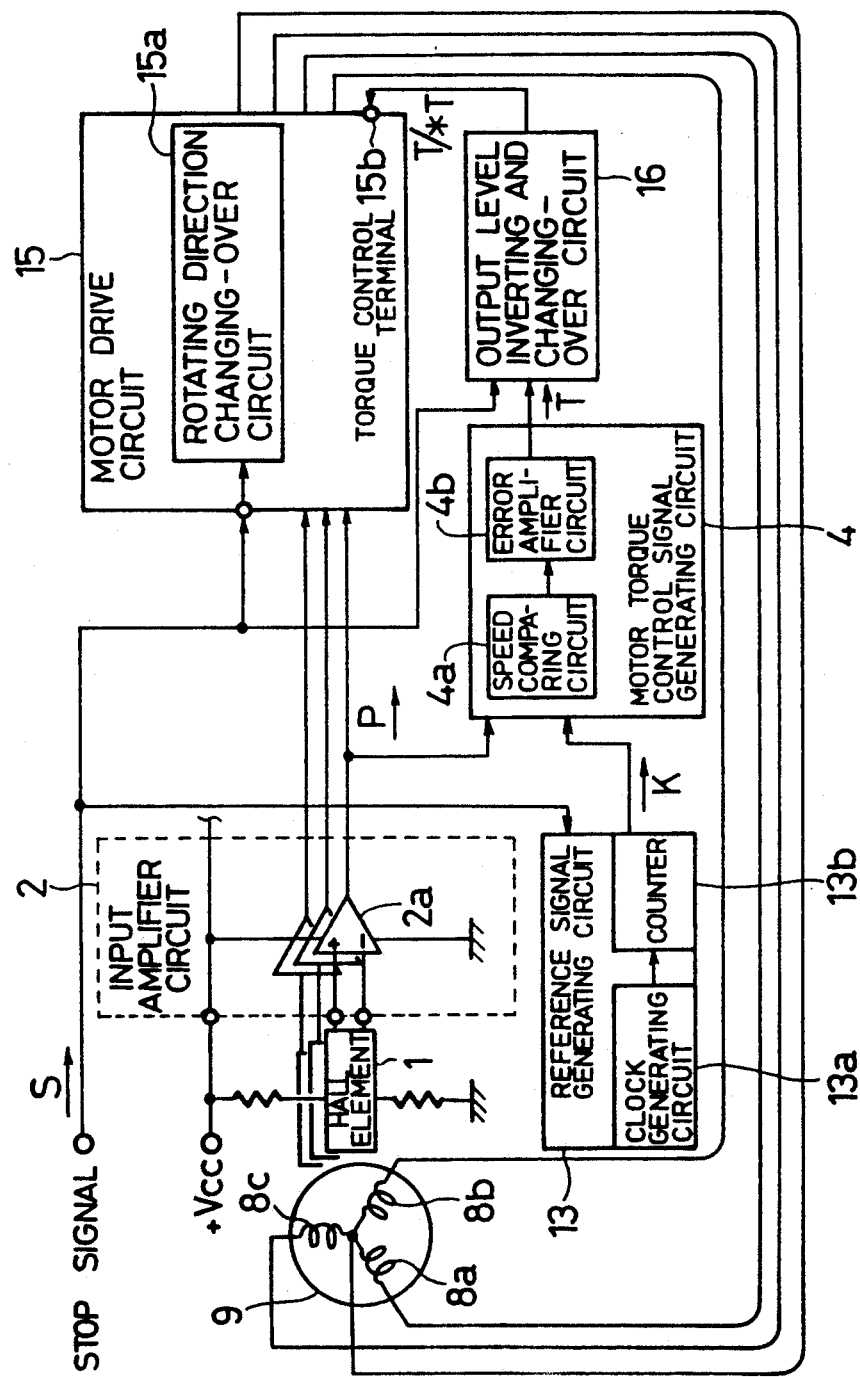
FIG. 1 is a three phase motor control circuit as one embodiment of the motor control circuit according to the present invention.
Figure 2A:
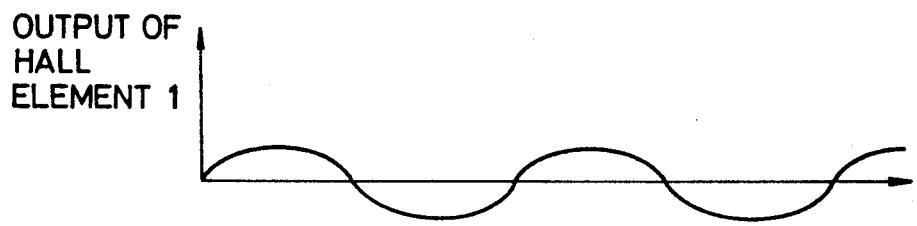
FIGS. 2(a)-2(c) are shown signal waveform diagrams for explaining the operation of the motor control circuit as shown in FIG. 1.
Figure 2B:
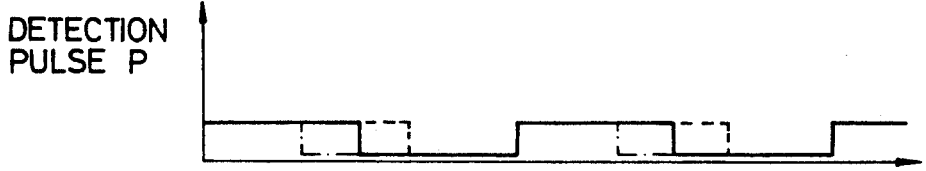
Figure 2C:
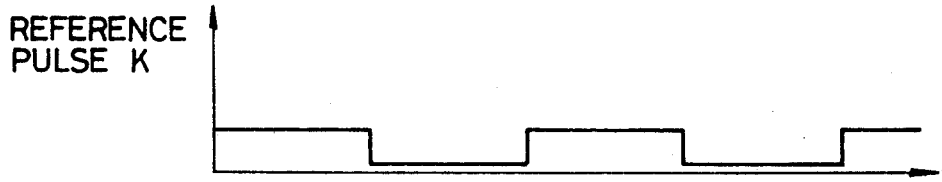
Figure 2D:
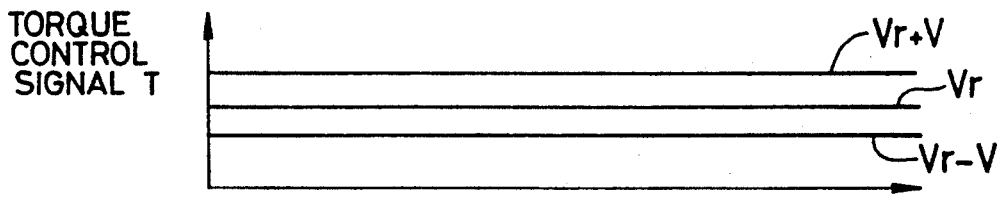
Figure 2E:
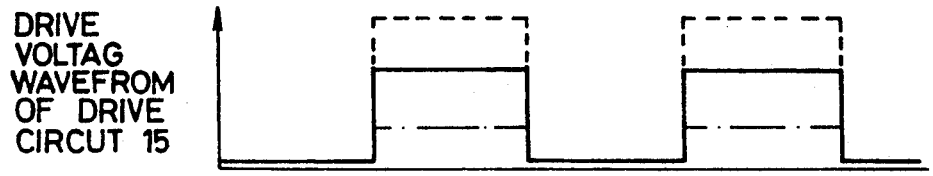
Figure 3:
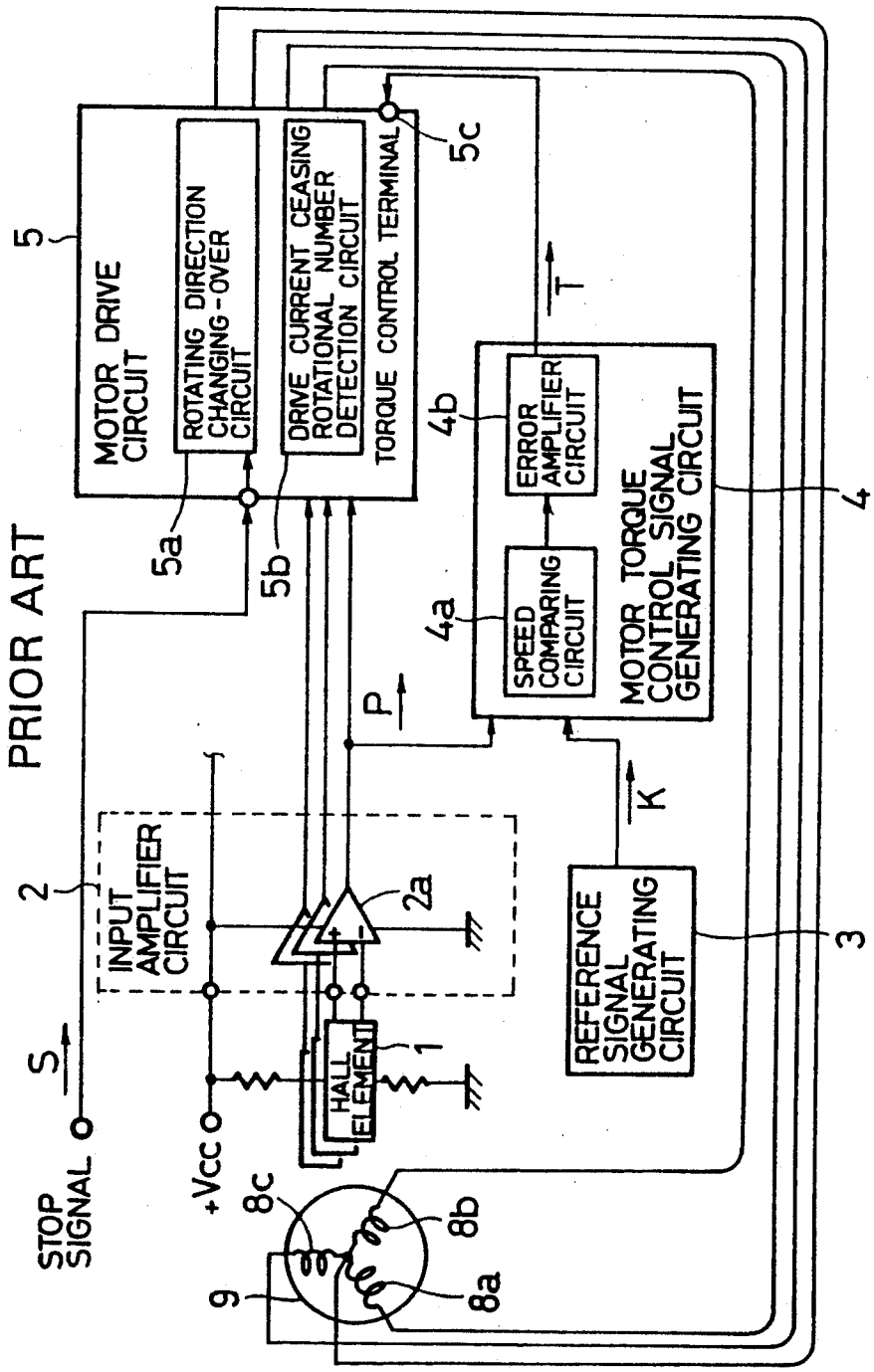
FIG. 3 is a three phase motor control circuit of a conventional motor control circuit.

The motor control circuit of the present embodiment as shown in FIG. 1 is provided with a reference pulse generating circuit 13 in place of the reference pulse generating circuit 3 in the motor control circuit as shown in FIG. 3, a drive circuit 15 without the driving current ceasing rotation number detection circuit 5b in place of the drive circuit 5 and is further provided with an output level inverting and changing-over circuit 16 disposed between the torque control signal generating circuit 4 and the drive circuit 15.

Like the conventional motor control circuit, the output (see (a) in FIG. 2) of the Hall element 1 which detects the rotating condition of the motor 9 is inputted to the input amplifier circuit 2, the input signal is amplified in the differential amplifier 2a and is outputted as a detection pulse P after being waveshaped. The detection pulse P (see (b) in FIG. 2) is transmitted to the torque control signal generating circuit 4 and the drive circuit 15.

The reference pulse generating circuit 13 is constituted by, for example, a clock generating circuit 13a and a counter 13b serving as a dividing circuit. Through setting a count value in the counter 13b the reference pulse generating circuit 13 produces a reference pulse K having a predetermined pulse width and phase which determines a rotation speed of the motor 9 by dividing the pulses from the clock generating circuit 13a based upon the set value, and outputs the same. The reference pulse K (see (c) in FIG. 2) is a pulse train having a period corresponding to a target rotational speed, therefore when the target rotational speed is altered the target value set by the counter 13b in the reference pulse generating circuit 13 is changed accordingly. Thereby the dividing rate for the clocks is changed and the period of the reference pulse K is changed. However, under a normal operation, the reference pulse generating circuit 13 outputs a reference pulse K having the same period as that of the conventional reference pulse generating circuit 3.

The torque control signal generating circuit 4, like the conventional one, compares the detection pulse P with the reference pulse K at the speed comparing circuit 4a, generates a comparison result representing a period deviation amount or phase deviation amount of these pulses, in other words a speed deviation amount corresponding to a rotational speed condition represented by these pulses, and the comparison result is applied to the error amplifier circuit 4b after integration thereof. Thereby a torque control signal T in response to the speed deviation amount represented by these pulses P and K is produced. The period of the detection pulse P and the reference pulse K can be measured for example by counting the widths of the respective pulses with the reference clock. Further, when detecting the speed deviation amount by comparing the phases of these pulses the deviation can be obtained by measuring the difference in the pulse widths of the two pulses. In the present embodiment, the period deviation amount is generated as the speed difference signal, however depending on waveform configurations of the detection pulse P and the reference pulse K the phase deviation amount of these pulses can be used as the speed difference signal.

The output level inverting and changing-over circuit 16 is constituted by such as a change-over switch and an operational amplifier. Under a normal operation in which the motor 9 is rotating in the positive direction the output level inverting and changing-over circuit 16 like the conventional circuit transmits the torque control signal T as it is to the torque control terminal 15b in the drive circuit 15. Accordingly, under a normal operation the circuit 16 gives no effect on the control operation of the motor. On the other hand, during the motor rotation stopping control, namely the motor braking operation the circuit 16 generates a signal of which voltage level is inverted of the voltage level of a torque control signal T with reference to the voltage level of the torque control signal corresponding to the reference rotation condition.

Now, the voltage level applied at the torque control terminal 15b of the torque control signal T when the motor 9 is rotating at the reference rotational number is designated as Vr which represents the reference level for the signal inversion. In the motor control circuit which is applied to the fields indicated previously, the reference voltage level Vr is normally set at $+Vcc/2$, wherein $+Vcc$ is the voltage of the power source. For example, when $+Vcc$ is 5V, Vr is 2.5V.

Now, the motor control operation is explained more specifically wherein the error voltage produced by the error amplifier circuit 4b in response to the speed deviation amount of the pulses P and K is designated as V and the voltage of the torque control signal T as VT. When the periods of the pulses P and K coincide, namely when the motor 9 is rotated at the reference rotational speed, the error voltage V is O, because the error is O. As a result, the torque control voltage VT is rendered Vr+O and the voltage Vr is applied at the torque control terminal 15b.

On the other hand, when the rotation of the motor lags from the reference rotational number, the period of the detected signal from the Hall element 1 reduces and the phase thereof lags; that is the phase of the detection pulse P lags from that of the reference pulse K. As a result, an error appears between these pulses to generate an error voltage +V. At this moment, the torque control voltage VT becomes Vr+V and the voltage of Vr+V is applied at the torque control terminal 15b. Contrarily when the rotation of the motor advances with respect to the reference rotational number, the torque control voltage VT becomes Vr−V and the voltage of Vr−V is applied at the torque control terminal 15b.

Therefore, under a normal condition the output level inverting and changing-over circuit 16 applies the torque control signal T in the form of voltage Vr±V corresponding to the detection pulse P to the torque control terminal 15b as it is as shown in (d) in FIG. 2.

The drive circuit 15 receives the detection pulse P and produces a drive signal for inducing torque based upon the detection pulse P. As explained previously, at this moment, the signal from the output level inverting and changing-over circuit 16 is applied at the torque control terminal 15b and the amplitude of the drive signal, namely the magnitude of the torque, is determined according to the amplitude of the voltage, in that Vr±V. For example, when the motor is in the condition of the reference rotational speed, the amount of the error voltage V is O, therefore the voltage Vr is applied at the torque control terminal 15b. Based on the applied voltage a drive signal having a predetermined voltage waveform (see the solid line of (e) in FIG. 2) corresponding to the detection pulse P and causing a current value inducing the reference torque which balances the resistive force by the load is applied to the motor 9. When the rotation speed of the motor 9 drops in comparison with the period of the reference pulse K which sets the reference rotation speed and the period of the detection pulse P is prolonged, a further large drive current caused by a further higher voltage (see the dotted line of (e) in FIG. 2) than the previous one according to the signal voltage Vr+V is transmitted to the motor 9. Thereby, a larger torque than the previous reference torque, larger torque than the resistive force of the load, is generated to accelerate the motor 9. Contrarily, the rotation speed of the motor rises, and a smaller drive current caused by a further lower voltage (see the dashed line of (e) in FIG. 2) than the previous one according to the signal voltage Vr−V is transmitted to the motor 9. Thereby, the torque is reduced below the reference torque value and the motor speed is decelerated due to the resistive force of the load. During a normal control operation, such drive currents are supplied to the windings 8a, 8b and 8c as explained above to maintain the rotation of the motor 9. In the above operation, the reduction of the drive torque includes rendering the torque zero by ceasing the drive current supply.

Further, the stop control of the motor control circuit according to the present embodiment is explained in detail when a stop signal S is received from an external device under the normal rotation condition.

Different from the conventional circuit, the stop signal S is applied to the output level inverting and changing-over circuit 16 and the reference pulse generating circuit 13 as well as the drive circuit 15 and affects the operation of these circuits. Further, the direction of the current is changed-over by the rotating direction changing-over circuit 15a to the opposite direction.

When the reference pulse generating circuit 13 receives the stop signal S, the reference pulse generating circuit 13 changes the target rotating speed, produces a reference pulse K having a pulse width commanding a lower rotating speed as a second reference signal and outputs the same. At this moment, since the current direction is already changed-over by the rotating direction changing-over circuit 15a, the operation hereinbelow relates to that of reversing rotation. At first, when the stop signal S is received, the reference pulse K having a lagged phase is compared with the detection pulse P which represents a rotating condition at a higher speed than the set speed wherein the phase of the detection pulse P advances beyond the phase of the reference pulse K. At this instance, a large phase difference is generated, such that the output voltage of the speed comparing circuit 4a increases. As a result, the output voltage of the error amplifier circuit 4b also increases. The voltage VT of the torque control signal T at the time of an over speed shows Vr−V so that the control circuit operates to generate a torque of as small as possible with the large error voltage V. Therefore, the voltage VT shows a low value near the ground level potential with respect to Vr=+Vcc/2. The reason why the target rotating speed is changed to a lower rotating speed when the stop signal is received is for generating a large error signal V.

Now, the output level inverting and changing-over circuit 16 which has received the stop signal S also receives the voltage VT=Vr−V and inverts the voltage level with reference to that of Vr. As a result, the input voltage to the torque control terminal 15b of a torque control signal *T from the output level inverting and changing-over circuit 16 which is obtained by inverting the large error voltage −V shows Vr+V, wherein *T indicates the inverted signal of the torque control signal T.

Upon reception of the input signal, the drive circuit 15 operates to cause a current which generates a large torque. Moreover, since the drive circuit 15 which has received the stop signal S has already changed the current flowing direction by the rotating direction change-over circuit 15a, the input signal causes a large torque which rotates the motor in the opposite direction. As a result, the motor is driven by a large torque of opposing direction to generate a braking force thereto. With this large torque of opposing direction, the motor 9 is rapidly decelerated to reduce the rotation speed thereof.

When the rotation speed reduces below the set lower rotation speed commanded from the reference signal generating circuit 13, the period of the reference pulse K and that of the detection pulse P are reversed. At this instant, the output voltage of the speed comparison circuit 4a and further the output voltage of the error amplifier circuit 4b are inverted with reference to the reference voltage Vr to change the error voltage to +V. The output voltage VT of the torque control signal T shows Vr+V. As a result, the torque control signal *T of the output level inverting and changing-over circuit 16 changes from Vr to Vr−V. Thereby, the torque driving the motor into reversing rotating direction is gradually decreased. Thereafter when the rotating speed of the motor further reduces, the phase difference increases and the variable voltage +V also increases to further reduce the output voltage Vr−V corresponding to the torque control signal *T.

When the output voltage Vr−V corresponding to the torque control signal *T reduces below a predetermined value, the lower control limit of torque generation is exceeded to cause a condition where no torque is generated, in other words a condition where the drive circuit 15 outputs no drive current so that the torque generating operation by the drive current is naturally ceased. Thereby the motor rotation is stopped by its own frictional force.

As will be apparent from the above, the motor 9 is gradually brought to small reversing torque conditions to reduce the rotating speed in a ,short time while preventing reverse rotation thereof; namely, after reducing the rotating speed sufficiently near to standstill and then the drive current to the windings 8a, 8b and 8c is ceased. Thereby, the rotation of the motor 9 is immediately stopped due to the frictional force thereof. Accordingly the driving current ceasing rotational number detecting circuit which was indispensable with the conventional circuit is eliminated.

As will be understood from the above explanation, according to the present invention the reversing torque during the braking operation is controlled in such a manner that the magnitude of the reversing torque decreases in response to the decrease of the motor rotation number in the positive rotating direction. Moreover with addition of a simple circuit of the output level inverting and changing-over circuit, the rotation of the motor 9 is rapidly stopped.

In the above embodiment, the control wherein the voltage Vr±V corresponding to the torque control signal T is generated in response to the error signal V with reference to Vr is explained, however, when the voltage of the torque control signal T reduces below Vr, the motor driving operation may be interrupted by preventing the output from the drive circuit 15. In this case, when the voltage corresponding to the torque control signal T reduces below Vr, the output current from the drive circuit 15 is interrupted to stop the motor drive.

Further, in the above embodiment, the speed comparing circuit generates a signal depending on the speed difference by comparing periods or phases of the reference pulse and the detection pulse, however it is satisfactory when the speed comparing circuit generates a signal which corresponds to the amount of variation with respect to the reference rotation number of the motor. Accordingly, both the reference pulse and the detection pulse need not be a pulse signal. Therefore it is, enough if, the reference pulse is a signal having a predetermined frequency and the detection pulse is a signal of which frequency varies in response to the rotational speed of the motor, because comparison of the frequencies of these signals enables a signal representing the rotational speed difference to be obtained.

I claim:

1. A motor control circuit which comprises a reference signal generating circuit for outputting a reference signal for setting a reference rotational speed of the motor; a torque control signal generating circuit for outputting a torque control signal which brings back to a torque corresponding to the reference signal in response to a rotational speed condition difference represented by a detection signal relating to the rotational speed of the motor and the reference signal; and a drive circuit which drives to rotate the motor by supplying a driving current which causes to generate a torque according to the torque control signal, and which further performs a control for stopping the rotation of the motor by generating a torque in the motor into the reversing direction when a stop signal for stopping the motor is received, further comprising a level inverting circuit disposed between said torque control signal generating circuit an said drive circuit for inverting the level of the torque control signal with respect to a predetermined reference level, said level inverting circuit outputs a level inverted signal of the torque control signal to said drive circuit when the stop signal is received, and said reference signal generating circuit determines the reference signal as a first reference signal and further outputs a second reference signal determined with reference to a lower rotational speed than the reference rotational speed to said torque control signal generating circuit when the stop signal is received.

2. A motor control circuit according to claim 1, wherein said level inverting circuit inverts the level of a torque control signal with reference to a predetermined level.

3. A motor control circuit according to claim 1, wherein said level inverting circuit inverts the level of a torque control signal with reference to the level of the torque control signal which is generated when the detection signal represents a rotational speed equal to that represented by the reference signal when the stop signal is received, and further functions as a change-over circuit is received, and further functions as a change-over circuit which outputs the torque control signal without inverting the level thereof when no stop signal is received.

4. A motor control circuit according to claim 3, wherein the torque control signal generating circuit includes a speed comparing circuit which receives the detection signal and the reference signal and outputs a signal representing an error amount corresponding to the rotational speed difference represented by the detection signal and the reference signal by comparing the rotational speed conditions represented by the detection signal and the reference signal, and an amplifier circuit which receives the output from said speed comparing circuit and generates the torque control signal.

5. A motor control circuit according to claim 4, wherein said speed comparing circuit compares the phases of the pulses instead of comparing the periods of the pulses and outputs the error amount thereof.

6. A motor control circuit according to claim 3, wherein the level of the torque control signal which is generated when the detection signal represents a rotational speed equal to that represented by the reference signal is set at about ½ of the power source voltage of the motor control circuit.

7. A motor control circuit according to claim 3, wherein said drive circuit performs a control to stop the driving of the motor when said drive circuit receives a torque control signal having a lower level than that of the torque control signal which is generated when the detection signal represents a rotational speed equal to that represented by the reference signal.

8. A motor control circuit which comprises a reference signal generating circuit for outputting a reference signal for setting a reference rotational speed of the motor; a torque control signal generating circuit for outputting a torque control signal in a direction which generates a torque corresponding to the reference signal in response to a rotational speed condition difference represented by a detection signal relating to the rotational speed of the motor and the reference signal and further outputting a torque control signal which generates a torque corresponding to the reference signal when no difference of rotational speed condition is reached; and a drive circuit which droves to rotate the motor by supplying a driving current which causes to generate a torque according to the torque control signal, and which further performs a control for stopping the rotation of the motor by driving the motor into the reversing direction when a stop signal for stopping the motor is received, further comprising a level inverting and changing-over circuit disposed between said torque control signal generating circuit and said drive circuit for outputting a torque control signal by inverting the level thereof with reference to the level of the torque control signal which generates the torque corresponding to the reference signal when the stop signal is received and further outputting the torque control signal without inverting the level thereof when no stop signal is received, said reference signal generating circuit includes a clock generating circuit and a driving circuit, and said reference signal generating circuit determines the reference signal as a first reference signal and further generates a second reference signal determined with reference to a lower rotational speed than the reference rotational sped when the stop signal is received by changing the dividing rate of said driving circuit and outputs the same to said torque control signal generating circuit.

9. A motor control circuit which comprises a reference signal generating circuit which generates a reference signal representing a reference rotational speed of the motor a speed signal generating circuit which generates a rotational speed signal corresponding to a rotational speed of the motor a speed comparing circuit which compares the reference signal and the rotational speed signal and generates a speed difference signal corresponding to the speed difference represented by the reference signal and the rotational speed signal a torque control signal generating circuit which generates a torque control signal which operates to bring back to a torque corresponding to the reference signal in response to the speed difference upon reception of the speed difference signal a drive circuit which drives to rotate the motor by supplying a driving current which causes to generate a torque according to the torque control signal and which further performs a control for stopping the rotation of the motor by generating a torque in the motor into the reversing direction when a stop signal for stopping the motor is received and a level inverting circuit disposed between said torque control signal generating circuit and said drive circuit for inverting the level of the torque control signal with respect to a predetermined reference level, wherein said level inverting circuit outputs a level inverted signal of the torque control signal to said drive circuit when the stop signal is received, and said reference signal generating circuit determines the reference signal as a first reference signal and further outputs a second reference signal determined with reference to a lower rotational speed than the reference rotational speed to said speed comparing circuit when the stop signal is received.

10. A motor driving system which comprises a motor a reference signal generating circuit which generates a reference signal representing a reference rotational speed of the motor ; a speed signal generating circuit which generates a rotational speed signal corresponding to a rotational speed of the motor a speed comparing circuit which compares the reference signal and the rotational speed signal and generates a speed difference signal corresponding to the speed difference represented by the reference signal and the rotational speed signal a torque control signal generating circuit which outputs a torque control signal which operates to bring back to a torque corresponding to the reference signal in response to the speed difference upon reception of the speed difference signal and which further outputs a torque control signal which generates a torque corresponding to the reference signal when the speed difference signal shows no difference ; a drive circuit which drives to rotate the motor by supplying a driving current which causes to generate a torque according to the torque control signal and which further performs a control for stopping the rotation of the motor by generating a torque in the motor into the reversing direction when a stop signal for stopping the motor is received; and a level inverting circuit disposed between said torque control signal generating circuit and said drive circuit for inverting the level of the torque control signal with respect to a predetermined reference level, wherein said level inverting circuit outputs a level inverted signal of the torque control signal to said drive circuit when the stop signal is received, and said reference signal generating circuit determines the reference signal as a first reference signal and further outputs a second reference signal determined with reference to a lower rotational speed than the reference rotational speed to said speed comparing circuit when the stop signal is received.

* * * * *